United States Patent
Claeys et al.

(12)

(10) Patent No.: US 6,797,788 B1
(45) Date of Patent: Sep. 28, 2004

(54) THERMOPLASTIC ALIPHATIC POLYESTER COMPOSITIONS, PREPARATION METHOD AND USES THEREOF

(75) Inventors: Ivan Claeys, Boortmeerbeek (BE); Henri Wautier, Braine-Le-Comte (BE); Dino Manfredi, Houthalen-Helchteren (BE)

(73) Assignee: SOLVAY (Societe Anonyme), Brussels (BE)

( * ) Notice: Subject to any disclaimer, the term of this patent is extended or adjusted under 35 U.S.C. 154(b) by 19 days.

(21) Appl. No.: 10/030,140

(22) PCT Filed: Jul. 25, 2000

(86) PCT No.: PCT/EP00/07274

§ 371 (c)(1),
(2), (4) Date: Apr. 30, 2002

(87) PCT Pub. No.: WO01/07512

PCT Pub. Date: Feb. 1, 2001

(30) Foreign Application Priority Data

Jul. 27, 1999 (BE) .............................................. 9900510

(51) Int. Cl.⁷ .......................... C08L 67/00; C08G 63/91
(52) U.S. Cl. ........................ 525/411; 525/415; 525/437; 525/444; 528/272; 528/354
(58) Field of Search ................................ 525/411, 415, 525/437, 444; 528/272, 354

(56) References Cited

U.S. PATENT DOCUMENTS 5,798,435 A  8/1998  Brosch et al.

FOREIGN PATENT DOCUMENTS

EP    0443270     8/1991
WO    95 18169    7/1995

OTHER PUBLICATIONS

P. Cavallaro et al.: "Reactive blending of bioaffine polyesters through free-radical processes" Angewandte Makromolekulare Chemie, Applied Macromolecular Chemistry and Physics, vol. 210, pp. 129–141 Aug. 1, 1993.

Catia Bastioli: "Biodegradable materials—present situation and future perspectives" Macromol. Symp., vol. 135, pp. 193–204 1998.

*Primary Examiner*—Patricia A. Short
(74) *Attorney, Agent, or Firm*—Oblon, Spivak, McClelland, Maier & Neustadt, P.C.

(57) ABSTRACT

The invention concerns thermoplastic aliphatic polyester compositions characterized by a melt flow index (RMFI) ranging between 1.1 and 2.5. The invention also concerns a method for preparing said compositions which are used for making films, foams, flasks or thermoformed products. The resulting films obtained from said compositions are used for making litter bags, films for agricultural use, packaging films, shrouds, diaper drawers and adhesive films.

13 Claims, 6 Drawing Sheets

THERMOPLASTIC ALIPHATIC POLYESTER COMPOSITIONS, PREPARATION METHOD AND USES THEREOF

BACKGROUND OF THE INVENTION

1. Field of the Invention

The invention relates to compositions for thermoplastic aliphatic polyesters, a process for their preparation, their use for the manufacture of films, foams, bottles or thermally molded products, the films, foams, bottles and thermally molded products obtained and the use of the films obtained.

2. Description of the Background

The thermoplastic aliphatic polyesters, and in particular the $\epsilon$-caprolactone polymers, have a great many desirable properties, including a good biodegradability and good tensile strength. These properties make the thermoplastic aliphatic polyesters, and in particular the $\epsilon$-caprolactone polymers, especially attractive in the polymer industry.

For many potential applications of the thermoplastic aliphatic polyesters, and in particular the $\epsilon$-caprolactone polymers, it nonetheless is necessary that these polymers be characterized by a behavior of hardening under elongation in the molten state. There may be cited among these applications the films used, for example, for the making of trash bags, films for agriculture, films for packaging, shrouds, disposable diapers or adhesive films; foams, bottles and thermally molded products including, for example, pots for young plants.

Unfortunately, the thermoplastic polyesters and in particular the $\epsilon$-caprolactone polymers, do not naturally display this behavior of hardening under elongation in the molten state.

It is known to increase the thermoresistance of $\epsilon$-caprolactone polymers by bringing about their cross-linking through reaction with organic peroxides or through radiation with gamma rays. In these cases, however, the polymers obtained are characterized by a very high gel level (level of insoluble polymers) resulting in the occurrence of heterogeneous zones in the films which they form and consequently a poor surface quality of these films. In addition, very often there is noted a puncturing of the bubble which is obtained at the time of blowing, making the obtaining of a film impossible.

In addition, it also is known to add starch to the $\epsilon$-caprolactone polymers so that the compositions obtained display the properties required to give rise to the manufacture of films (C. Bastioli, Macromol. Symp., 135, 193–204 (1998)). Unfortunately, the $\epsilon$-caprolactone polymers present in these compositions are characterized disadvantageously by an excessively low crystallization speed, when the external temperature is too high, to ensure a sufficient output of the films formed.

SUMMARY OF THE INVENTION

This invention has the purpose of compositions for thermoplastic aliphatic polyesters, in particular for $\epsilon$-caprolactone polymers, which do not display the aforesaid drawbacks.

This invention also has the purpose of a process for preparation of these compositions.

The invention further has the purpose of the use of these compositions for the manufacture of films, foams, bottles or thermally molded products as well as the films, foams, bottles and thermally molded products obtained and the use of the films obtained for manufacturing trash bags, films for agriculture, films for packaging, shrouds, disposable diapers and adhesive films.

To this end, the invention relates first of all to compositions for thermoplastic aliphatic polyesters characterized by an RMFI value ranging between 1.1 and 2.5.

DETAILED DESCRIPTION OF THE PREFERRED EMBODIMENTS

Figure 1:
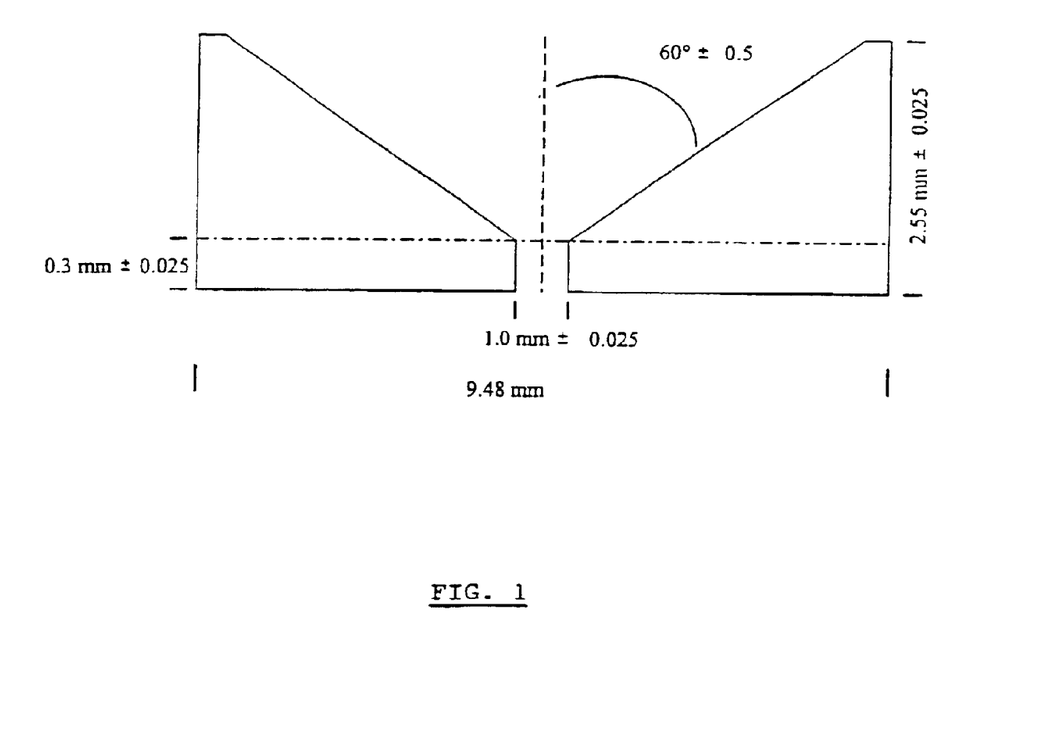
FIG. 1 depicts a conical die employed to measure the $MFI_{0.3/1}$ of an aliphatic polyester.

For the purposes of this invention, RMFI is understood to refer to the ratio between two MFI measured at the same temperature, that is, the ratio between the $MFI_{8/2}$ obtained with a cylindrical die (height 8 mm +/−0.025, diameter 2.095 mm +/−0.003) and the $MFI_{0.3/1}$ obtained with a conical die as illustrated in FIG. 1. The conical die is characterized by a cone angle of 60° +/−0.5, an external diameter of 9.48 mm, an internal diameter of 1.0 mm +/−0.025, a total height of 2.55 mm +/−0.025 and a cylindrical-section height of 0.3 mm +/−0.025.

The two MFI are obtained by measuring the quantity of polymer passing through a calibrated die, the characteristics of which are set forth hereinabove, under a weight of 5 kg and at the same temperature. The measurement temperature generally is 20 to 40° C. higher than the melting temperature of the thermoplastic aliphatic polyester, in particular 20 to 40° C. higher than the melting temperature of the $\epsilon$-caprolactone polymers. The measurement temperature preferably is 40° C. higher than the melting temperature of the thermoplastic aliphatic polyester, in particular 40° C. higher than the melting temperature of the $\epsilon$-caprolactone polymers. The measurement temperature usually is 100° C. for the $\epsilon$-caprolactone homopolymers. The MFI are expressed in dg/min.

The RMFI value is an indication of the branching level in the compositions according to the invention. An RMFI value ranging between 1.1 and 2.5 generally corresponds to a low, but not non-existent, branching level.

The compositions according to the invention usually are characterized by an RMFI value in excess of or equal to 1.1, preferably in excess of or equal to 1.2, particularly preferably in excess of or equal to 1.3

The compositions according to the invention usually are characterized by an RMFI value less than or equal to 2.5, preferably less than or equal to 2, particularly preferably less than or equal to 1.8.

The compositions according to the invention also have a gel level less than or equal to 0.5%.

For the purposes of this invention, gel level is understood to refer to the level of polymers insoluble in chloroform extracted by means of a soxhlet after 8 hours.

The compositions according to the invention usually are characterized by a gel level less than or equal to 0.5%, preferably equal to zero.

The compositions according to the invention also display a hardening behavior under elongation in the molten state characterized by an exponential increase in elongational viscosity according to time.

Elongational viscosity is understood to refer to the elongational viscosity as determined by means of a rheometer, at a temperature 20 to 40° C. higher than the melting temperature of the thermoplastic aliphatic polyester, in particular at a temperature 20 to 40° C. higher than the melting temperature of the $_\epsilon$-caprolactone polymers (the temperature usually is 80° C. for the $_\epsilon$-caprolactone homopolymers) for an elongation gradient of 1 s$^{-1}$, on a sample obtained by extrusion and subjected to a release of internal stresses prior to the measurements.

In addition, the compositions according to the invention are characterized in that the point of inflection corresponding to the exponential increase in the elongational viscosity according to time generally is less than 3 seconds, preferably less than 2 seconds.

For the purposes of this invention, thermoplastic aliphatic polyesters are understood to refer to aliphatic polyesters and copolyesters in which the ester functions are separated by a chain of at least 2 carbon atoms, possibly substituted.

As such polyesters or copolyesters, there may be cited in particular those derived from hydroxyalcanoates, in particular from 3-hydroxybutyrate, from 3-hydroxyvalerate and from 3-hydroxypropionate, but also polybutylene succinate and the $_\epsilon$-caprolactone polymers.

The $_\epsilon$-caprolactone polymers are very particularly preferred.

The thermoplastic aliphatic polyesters of the compositions according to the invention therefore preferably are $_\epsilon$-caprolactone polymers.

$_\epsilon$-caprolactone polymers are understood to refer to the $_\epsilon$-caprolactone homopolymers as well as to the copolymers with a preponderant $_\epsilon$-caprolactone content, for example at least 50% by weight, with other monomers, preferably with other cyclic lactones. Among these cyclic lactones there may be cited, for example, $_\beta$-propiolactone, $_\gamma$-butyrolactone, $_\delta$-valerolactone, 1,4-dioxane-2-one 1,4-dioxepane-2-one, 1,5-dioxepane-2-one, glycolide (1,4-dioxane-2,5-dione) and the substituted derivatives thereof, as well as L-lactide, D-lactide, DL-lactide.

The $_\epsilon$-caprolactone polymers preferably are $_\epsilon$-caprolactone homopolymers.

The compositions for thermoplastic aliphatic polyesters, in particular for $_\epsilon$-caprolactone polymers, also generally are characterized by a nearly linear relationship (absence of a Newtonian plateau) between the dynamic viscosity and the frequency when these are shown on a logarithmic graph.

The dynamic viscosity usually is measured at a temperature 20 to 40° C. higher than the melting temperature of the thermoplastic aliphatic polyester, in particular at a temperature 20 to 40° C. higher than the melting temperature of the $_\epsilon$-caprolactone polymers (the temperature usually is 80° C. for the $_\epsilon$-caprolactone homopolymers), between 0.1 and 100 rad/s, by means of a rheogoniometer with imposed deformation on a sample with a diameter of 25 mm and a thickness of 2 mm cut into a pressed sheet, placed between two parallel plates and subjected to a deformation.

The compositions according to the invention furthermore usually are characterized by a tan $\delta$ value, at a temperature 20 to 40° C. higher than the melting temperature of the thermoplastic aliphatic polyester, in particular at a temperature 20 to 40° C. higher than the melting temperature of the $_{\epsilon\epsilon}$-caprolactone polymers (the temperature generally is 80° C. for the $_\epsilon$-caprolactone homopolymers) and 0.1 rad/sec, less than or equal to 5, preferably less than or equal to 2.5.

For the purposes of this invention, tan $\delta$ is understood to refer to the ratio between the modulus of loss G" and the modulus of elasticity G', measured at the same temperature 20 to 40° C. higher than the melting temperature of the thermoplastic aliphatic polyester, in particular at the same temperature 20 to 40° C. higher than the melting temperature of the $_\epsilon$-caprolactone polymers (the temperature generally is 80° C. for the $_\epsilon$-caprolactone homopolymers), by means of a rheogoniometer with imposed deformation on a sample, placed between two parallel plates and subjected to a deformation, with a diameter of 25 mm and a thickness of 2 mm, cut into a pressed sheet.

The compositions according to the invention furthermore usually are characterized by a more rapid crystallization than the corresponding compositions characterized by an RMFI value ranging between 0.85 and 1.05.

Thus, the compositions according to the invention usually have a crystallization temperature, measured by differential thermal analysis, in the first cooling pass, after having erased the thermal history thereof, with a scanning speed of 10° K/min, at least 1° C. higher than that of corresponding compositions characterized by an RMFI value ranging between 0.85 and 1.05.

For the purposes of this invention, corresponding compositions characterized by an RMFI value ranging between 0.85 and 1.05 are understood to refer to compositions corresponding from any point of view to the compositions according to the invention, but which are characterized by an RMFI value ranging between 0.85 and 1.05. Such an RMFI value ranging between 0.85 and 1.05 generally corresponds to a non-existent branching level.

Alternatively, the kinetics of crystallization may be revealed by measurements of dynamic viscosity according to time, for a given deformation frequency and thermal treatment. The compositions according to the invention thus have a crystallization speed such that the ratio between this crystallization speed and the crystallization speed of corresponding compositions characterized by an RMFI value ranging between 0.85 and 1.05, measured at the same temperature, is in excess of 1.

For the purposes of this invention, crystallization speed is understood to refer to the speed at which the crystals grow in the compositions according to the invention.

The crystallization speed may be determined by means of a rheogoniometer with imposed deformation. Measurements of the dynamic viscosity according to time, for a given deformation frequency, are performed on a sample subjected to a specific thermal treatment so as to follow the development of this rheological property throughout the crystallization process. The slope of the curve seen when the dynamic viscosity increases at the time of crystallization is a measurement of the crystallization speed.

The compositions according to the invention preferably have a crystallization speed such that the ratio between this crystallization speed and the crystallization speed of corresponding compositions characterized by an RMFI value ranging between 0.85 and 1.05, measured at the same temperature, is in excess of 1.25, particularly preferably in excess of 1.5.

The compositions according to the invention also have an induction time for crystallization such that the ratio between this induction time and the induction time of corresponding compositions characterized by an RMFI value ranging between 0.85 and 1.05, measured at the same temperature, is less than 1.

For the purposes of this invention, induction time for crystallization is understood to refer to the time required for nucleation to occur in the compositions according to the invention.

The induction time for crystallization corresponds to a time during which the dynamic viscosity remains constant prior to increasing significantly at the time of the measurements of dynamic viscosity according to time explained hereinabove.

The compositions according to the invention preferably have an induction time for crystallization such that the ratio between this induction time and the induction time of corresponding compositions characterized by an RMFI value ranging between 0.85 and 1.05, measured at the same temperature, is less than 0.85, particularly preferably less than 0.7.

The compositions according to the invention preferably comprise a thermoplastic aliphatic polyester, in particular an $\epsilon$-caprolactone polymer, the mean molecular mass in number of which, measured by gel permeation chromatography, is in excess of or equal to 10,000 g/mole.

The mean molecular mass in number of the thermoplastic aliphatic polyester, in particular of the $\epsilon$-caprolactone polymer, is preferably in excess of or equal to 10,000, particularly preferably in excess of or equal to 25,000, very particularly preferably in excess of or equal to 40,000 g/mole.

The compositions according to the invention preferably comprise a thermoplastic aliphatic polyester, in particular an $\epsilon$-caprolactone polymer, the mean molecular mass in number of which, measured by gel permeation chromatography, is less than or equal to 200,000 g/mole.

The mean molecular mass in number of the thermoplastic aliphatic polyester, in particular of the $\epsilon$-caprolactone polymer, is preferably less than or equal to 200,000, particularly preferably less than or equal to 175,000, very particularly preferably less than or equal to 150,000 g/mole.

Mean molecular mass in number measured by gel permeation chromatography is understood to refer to the mean molecular mass in number measured by gel permeation chromatography, by means of a column of the Polymer Laboratories Mix-C type and a refractometer of the Waters Differential Refractometer R401 type. The concentration of the sample is 20 mg/mL and the flow rate is 1 mL/min. The standards used are polystyrene standards. In the specific case of the $\epsilon$-caprolactone polymers, the solvent used is chloroform and the conversion factor used is 0.6.

The thermoplastic aliphatic polyester, in particular the $\epsilon$-caprolactone polymer, of the compositions according to the invention generally consists of a single polymer.

The thermoplastic aliphatic polyester of the compositions according to the invention also may result from the mixing of at least two thermoplastic aliphatic polyesters. In particular, the $\epsilon$-caprolactone polymer of the compositions according to the invention also may result from the mixing of at least two $\epsilon$-caprolactone polymers.

The thermoplastic aliphatic polyester, in particular the $\epsilon$-caprolactone polymer, may result from the mixing of at least two thermoplastic aliphatic polyesters, in particular of at least two $\epsilon$-caprolactone polymers, with mean molecular masses in number which are different but such that the thermoplastic aliphatic polyester, in particular the $\epsilon$-caprolactone polymer, of the compositions according to the invention is characterized by a mean molecular mass in number as defined hereinabove.

The thermoplastic aliphatic polyester, in particular the $\epsilon$-caprolactone polymer, of the compositions according to the invention preferably results from the mixing of 0.1 to 99.9% by weight of the total quantity of polymers, of a thermoplastic aliphatic polyester, in particular of an $\epsilon$-caprolactone polymer, of low molecular mass, and of 99.9 to 0.1% by weight of the total quantity of polymers, of a thermoplastic aliphatic polyester, in particular of an $\epsilon$-caprolactone polymer, of high molecular mass.

In a particularly preferred manner, the thermoplastic aliphatic polyester, in particular the $\epsilon$-caprolactone polymer, of the compositions according to the invention results from the mixing of 0.1 to 80% by weight of the total quantity of polymers, of a thermoplastic aliphatic polyester, in particular of an $\epsilon$-caprolactone polymer, of low molecular mass, and of 99.9 to 20% by weight of the total quantity of polymers, of a thermoplastic aliphatic polyester, in particular of an $\epsilon$-caprolactone polymer, of high molecular mass.

In a very particularly preferred manner, the thermoplastic aliphatic polyester, in particular the $\epsilon$-caprolactone polymer, of the compositions according to the invention results from the mixing of 0.1 to 70% by weight of the total quantity of polymers, of a thermoplastic aliphatic polyester, in particular of an $\epsilon$-caprolactone polymer, of low molecular mass, and of 99.9 to 30% by weight of the total quantity of polymers, of a thermoplastic aliphatic polyester, in particular of an $\epsilon$-caprolactone polymer, of high molecular mass.

In a truly preferred manner, the thermoplastic aliphatic polyester, in particular the $\epsilon$-caprolactone polymer, of the compositions according to the invention results from the mixing of 10 to 60% by weight of the total quantity of polymers, of a thermoplastic aliphatic polyester, in particular of an $\epsilon$-caprolactone polymer, of low molecular mass, and of 90 to 40% by weight of the total quantity of polymers, of a thermoplastic aliphatic polyester, in particular of an $\epsilon$-caprolactone polymer, of high molecular mass.

The thermoplastic aliphatic polyester, in particular the $\epsilon$-caprolactone polymer, of low molecular mass usually has a mean molecular mass in number, measured by gel permeation chromatography, in excess of or equal to 10,000 g/mole and less than or equal to 60,000 g/mole, and the thermoplastic aliphatic polyester, in particular the $\epsilon$-caprolactone polymer, of high molecular mass usually has a mean molecular mass in number, measured by gel permeation chromatography, in excess of 60,000 g/mole and less than or equal to 200,000 g/mole.

The thermoplastic aliphatic polyester, in particular the $\epsilon$-caprolactone polymer, of low molecular mass usually has a mean molecular mass in number, measured by gel permeation chromatography, less than or equal to 60,000 g/mole.

The thermoplastic aliphatic polyester, in particular the $\epsilon$-caprolactone polymer, of low molecular mass usually has a mean molecular mass in number, measured by gel permeation chromatography, in excess of or equal to 10,000, preferably in excess of or equal to 25,000, particularly preferably in excess of or equal to 40,000 g/mole.

The thermoplastic aliphatic polyester, in particular the $\epsilon$-caprolactone polymer, of high molecular mass usually has a mean molecular mass in number, measured by gel permeation chromatography, in excess of 60,000 g/mole.

The thermoplastic aliphatic polyester, in particular the $\epsilon$-caprolactone polymer, of high molecular mass usually has a mean molecular mass in number measured by gel permeation chromatography less than or equal to 200,000, preferably less than or equal to 175,000, particularly preferably less than or equal to 150,000 g/mole.

The compositions according to the invention furthermore may comprise a certain quantity of other biodegradable polymers such as, for example, polylactic acid, native or thermoplastic starch and modified or unmodified cellulose.

The compositions according to the invention furthermore may comprise one or more common additives for thermoplastic aliphatic polyesters, in particular for $\epsilon$-caprolactone polymers, such as, for example, stabilizing agents, antioxidant additives, antistatic agents, organic or inorganic coloring agents, antiblocking agents, nucleant agents and filler materials, etc.

The compositions according to the invention preferably furthermore comprise at least one filler material.

Any customary filler material for thermoplastic aliphatic polyesters, in particular for $\epsilon$-caprolactone polymers, may be used. Among the latter there may be cited, for example, neutral or basic carbon blacks, metal oxides (in particular iron oxide), silica, kaolin, mica, talc, zeolites, fiberglass, natural fibers (flax, wood, sisal), biodegradable filler materials (recycled paper, native starch) and calcium carbonate. The filler materials also may be surface-treated in order to facilitate their dispersion in the compositions according to the invention.

A particularly preferred filler material is calcium carbonate.

The compositions according to the invention usually comprise up to 80% by weight, preferably up to 60% by weight, particularly preferably up to 50% by weight, very particularly preferably up to 40% by weight of at least one filler material.

The compositions according to the invention also comprise at least one stabilizing agent.

All the stabilizing agents for thermoplastic aliphatic polyesters, in particular for $\epsilon$-caprolactone polymers, may be used. Particularly preferred stabilizing agents are compounds comprising a sterically congested phenol group, phosphorous compounds and mixtures thereof. It is a matter, for example, of compounds such as 1,3,5-trimethyl-2,4,6-tris(3,5-t-butyl-4-hydroxybenzyl)benzene, pentaerythrityl tetrakis-(3,5-di-t-butyl4-hydroxyphenylpropionate), tris-(2,4-di-t-butylphenyl)phosphite or the mixture of pentaerythrityl tetrakis-(3, 5-di-t-butyl4-hydroxyphenylpropionate) and tris-(2,4-di-t-butylphenyl)phosphite, preferably in equal quantities. A stabilizing agent which is well suited is 1,3,5-trimethyl-2,4,6-tris(3,5-t-butyl-4-hydroxybenzyl)benzene.

The compositions according to the invention may be obtained by any process whatsoever. Good results are obtained if they are prepared by means of the process according to the invention.

The invention also relates to a process for preparation of compositions for thermoplastic aliphatic polyesters according to which there is caused to react in a molten mass in an extruder a thermoplastic aliphatic polyester with a radical generator in a quantity ranging between 0.01 and 0.2% by weight in relation to the thermoplastic aliphatic polyester.

The thermoplastic aliphatic polyesters are defined hereinabove and preferably are $\epsilon$-caprolactone polymers.

In general the radical generator is used in the process according to the invention in a quantity sufficient to permit reaction between the radical generator and the thermoplastic aliphatic polyester, in particular the $\epsilon$-caprolactone polymer. In addition, it is desirable that the quantity not exceed the necessary quantity, because any excess of radical generator can lead to a cross-linking of the polymers present.

In general the quantity of radical generator ranges between 0.01 and 0.2% by weight in relation to the thermoplastic aliphatic polyester, in particular in relation to the $\epsilon$-caprolactone polymer.

The quantity is usually at least equal to 0.01, preferably at least equal to 0.025, particularly preferably at least 0.05% by weight in relation to the thermoplastic aliphatic polyester, in particular in relation to the $\epsilon$-caprolactone polymer. In general, the quantity is at most 0.2, preferably it is at most 0.15, particularly preferably it is at most 0.125% by weight in relation to the thermoplastic aliphatic polyester, particularly in relation to the $\epsilon$-caprolactone polymer.

As a radical generator, there preferably is used an organic peroxide, and more particularly an alkylperoxide. Among the latter there may be mentioned t-butylcumyl peroxide, 1,3-di(2-t-butylperoxyisopropyl)benzene, 2,5-dimethyl-2,5-di(t-butylperoxy)hexane, di(t-butyl)peroxide and 2,5-dimethyl-2,5-di(t-butylperoxy)-3-hexyne. The 2,5-dimethyl-2,5-di-t-butylperoxy-hexane (DHBP) is particularly preferred.

The radical generator may be introduced in any manner whatsoever so long as it is introduced continuously over time and is well dispersed in the molten material. Thus, for example, the radical generator may be introduced by spraying, for example by means of a spray-type injector or a vaporizer.

The radical generator preferably is introduced into the extruder in a mixture with carbon dioxide, by means of a thermoplastic aliphatic polyester containing it or by means of a filler material containing it.

According to a first preferred embodiment of the invention, the radical generator is introduced into the extruder in a mixture with carbon dioxide. Any device permitting the mixing of the radical generator and the carbon dioxide and the introduction of this mixture into the extruder may be used for this purpose. Depending on the temperature and pressure conditions, the carbon dioxide may be in the liquid, gaseous or supercritical state.

According to a second preferred embodiment of the invention, the radical generator is introduced into the extruder by means of a thermoplastic aliphatic polyester, preferably an $\epsilon$-caprolactone polymer, containing the radical generator.

According to a first variant, the radical generator, preferably DHBP, is introduced into the extruder in the form of a mixture of a thermoplastic aliphatic polyester, preferably an $\epsilon$-caprolactone polymer, in the solid state with the radical generator, preferably DHBP, also in the solid state. In a particularly preferred manner, the $\epsilon$-caprolactone polymer exists in the form of a powder the particles of which are of a size less than or equal to 100 $\mu$m. In a particularly preferred manner, the DHBP exists in the form of a talc powder impregnated with DHBP.

According to a second variant, the radical generator, preferably DHBP, is introduced into the extruder by means of a thermoplastic aliphatic polyester, preferably an $\epsilon$-caprolactone polymer, impregnated in advance with the radical generator, preferably DHBP, at the time of a pre-treatment.

According to a third preferred embodiment of the invention, the radical generator is introduced into the extruder by means of a filler material containing the radical generator. In a particularly preferred manner, the DHBP is introduced in the form of a mixture of calcium carbonate in the solid state and DHBP in the solid state, for example in the form of a talc powder impregnated with DHBP.

For the purposes of this invention, reaction in a molten mass is understood to refer to any reaction in the substantial absence of solvent or of diluent and at a temperature at least equal to the melting temperature of the thermoplastic aliphatic polyesters, in particular the $\epsilon$-caprolactone polymers.

Extruder is understood to refer to any continuous device comprising at least one loading zone and, at its outlet, a discharge zone preceded by a compression zone, the latter forcing the molten mass to pass through the discharge zone. In addition, the discharge zone may be followed by a granulation device or a device imparting a shaped form, such as a film or a bottle paraison, to the extruded material. Advantageously use will be made of known extruders based on twin-screw operation, whether co- or counter-rotary.

The extruder used in the process according to this invention preferably is fitted out so that it comprises successively a loading zone, a melting zone for the material, a homogenization zone, a reaction zone, optionally a zone for introduction of additives, optionally a degassing zone and a discharge zone preceded by a compression zone. Each of these zones has a very specific function and is at a very specific temperature.

The loading zone has the function of providing for loading of the polymer or polymers. It usually is at a temperature less than or equal to 20° C.

The zone for melting of the material has the function of providing for the melting of the material.

The homogenization zone has the function of homogenizing the molten material.

The reaction zone has the function of providing for reaction.

The temperature in the zone for melting and in the zone for homogenization of the material usually is in excess of or equal to the melting temperature of the polymer and less than or equal to the temperature at which the half-life period of the radical generator is ten times greater than the dwell time of the material in the zone.

The temperature in the reaction zone usually is in excess of or equal to the temperature at which the half-life period of the radical generator is less than or equal to the dwell time of the material in this zone.

The zone for introduction of additives has the function of providing for the introduction of additives at the time when the latter are added. The temperature of this zone usually is the same as that of the reaction zone or is slightly higher.

The degassing zone has the function of permitting elimination of the volatile products of decomposition of the radical generator. The temperature of this zone usually is the same at that of the reaction zone or is slightly lower.

The compression zone has the function of compressing the material so as to force it through the discharge zone. The temperature in the compression zone usually is dependent on the viscosity of the material to be discharged.

The discharge zone has the function of providing for the discharge of the material. The temperature in the discharge zone usually is dependent on the viscosity of the material to be discharged.

When the radical generator is introduced into the extruder in a mixture with carbon dioxide, it preferably is introduced into the material-melting zone of the extruder.

When the radical generator is introduced into the extruder by means of a thermoplastic aliphatic polyester, in particular an $\epsilon$-caprolactone polymer, it preferably is introduced into the loading zone of the extruder.

When the radical generator is introduced into the extruder by means of a filler material containing the radical generator, it preferably is introduced into the loading zone of the extruder.

In the course of the process, there may be incorporated at any point whatsoever one or more common additives for thermoplastic aliphatic polyesters, in particular $\epsilon$-caprolactone polymers, such as those described hereinabove.

In a preferred form of the process, at least one filler material is added during the process.

The preferred filler materials are those described hereinabove. A very particularly preferred filler material is calcium carbonate.

In the process according to the invention, there usually is added up to 80% by weight, preferably up to 60% by weight, particularly preferably up to 50% by weight, very particularly preferably up to 40% by weight of at least one filler material.

In the process according to the invention, there also may be added, for example, at least one stabilizing agent.

The preferred stabilizing agents are those described hereinabove. A stabilizing agent which is well suited is 1,3,5-trimethyl-2,4,6-tris(3,5-t-butyl-4-hydroxybenzyl)benzene.

When a stabilizing agent is added, it preferably is done at the same time as the filler material. These then preferably are introduced into the additive introduction zone.

The invention further relates to compositions for thermoplastic aliphatic polyesters, in particular $\epsilon$-caprolactone polymers, deriving from the process according to the invention.

This invention also relates to the use of the compositions according to the invention for the manufacture of films, foams, bottles or thermally molded products.

The invention also relates to the films obtained starting from the compositions according to the invention. The films obtained preferably are produced by blowing extrusion.

The invention also relates to the use of the films obtained for the manufacture of trash bags, films for agriculture, films for packaging, shrouds, disposable diapers and adhesive films.

The invention also relates to the foams obtained starting from the compositions according to the invention.

The invention also relates to the bottles obtained starting from the compositions according to the invention.

The invention also relates to the thermally molded products obtained starting from the compositions according to the invention.

The compositions for thermoplastic aliphatic polyesters, in particular $\epsilon$-caprolactone polymers, according to the invention therefore advantageously are characterized by a rheological behavior (elongational viscosity, tan δ, dynamic viscosity) such that they are characterized by an increase in deformation resistance at the time of blowing, hence an extremely stable blowing process and the formation of extremely stable bubbles with a homogeneous thickness.

In addition, the compositions according to the invention are characterized by a very low, or even non-existent, gel level (level of insoluble polymers), giving rise to films having no or very few heterogeneous zones and consequently displaying a very good surface quality and a transparency suited to the contemplated applications.

In addition, the compositions according to the invention are characterized by a greater crystallization speed than the corresponding compositions according to the prior art. By virtue thereof, the production yield of the films made is less sensitive to cooling and to the ambient temperature.

The films, foams, bottles or thermally molded products obtained starting from the compositions according to the invention furthermore are biodegradable, Finally, the films obtained also are characterized by a very good printability.

The examples which follow serve to illustrate this invention, without thereby limiting the scope thereof.

Poly-$\epsilon$-caprolactones

The poly-$\epsilon$-caprolactones used are the commercial poly-$\epsilon$-caprolactones CAPA® 650 and CAPA® 680 sold by SOLVAY INTEROX. They are characterized by:

- A mean molecular mass in number of 44,000 g/mole for the CAPA® 650 poly-$\epsilon$-caprolactones and 70,000 g/mole for the CAPA® 680 poly-$\epsilon$-caprolactone. The mean molecular mass in number is measured by gel permeation chromatography, using chloroform as solvent, by means of a column of the Polymer Laboratories Mix-C type and a refractometer of the Waters Differential Refractometer R401 type. The concentration of the sample is 20 mg/mL and the flow rate is 1 mL/min. The standards used are polystyrene standards and the conversion factor used is 0.6.
- A melting temperature of 58–60° C. for the CAPA® 650 poly-$\epsilon$-caprolactones and for the CAPA® 680 poly-$\epsilon$-caprolactone. The melting temperature is measured by differential thermal analysis, in the second pass and with a scanning speed of 10° K/min.

The CAPA® 65100 poly-$\epsilon$-caprolactone sold by SOLVAY INTEROX also was used. This poly $\epsilon$-caprolactone is chemically identical to the CAPA® 650 poly-$\epsilon$-caprolactone but is supplied in the form of a powder the particles of which are of a size less than or equal to 100 μm.

Radical Generator

The radical generator used is 2,5-dimethyl-2,5-di-t-butylperoxyhexane (DHBP) sold under the brand name LUPERSOL® 101 by PEROXID CHEMIE or 2,5-dimethyl-2, 5-di-t-butylperoxyhexane (DHBP) absorbed on talc, sold under the name DHBP-45-IC by PEROXID CHEMIE.

Filler Material

The filler material, when it is used, is calcium carbonate sold under the brand name OMYA BLH™ by OMYA Benelux.

Stabilizing Agent

The stabilizing agent, when it is used, is 1,3,5-trimethyl-2,4,6-tris(3,5-t-butyl-4-hydroxybenzyl)benzene sold under the brand name IRGANOX® 1330 by CIBA.

Extruders

A first extruder used is the twin-screw co-rotary WERNER & PFLEIDERER ZSK® 40 extruder. The diameter of the screws is 40 mm and their length is 1360 mm. The rotation speed of the screws is 200 rpm (rotations per minute).

The extruder is fitted out so that it comprises successively a loading zone, a zone for melting of the material, a homogenization zone, a reaction zone, optionally a zone for introduction of additives and a discharge zone preceded by a compression zone. Each of these zones is at a very specific temperature.

The $\epsilon$-caprolactone polymer loading zone is at a temperature less than or equal to 20° C.

The zone for melting of the material is at a temperature of 130° C. The DHBP is introduced into this zone in a mixture with carbon dioxide by means of the introduction device described hereinbelow.

The homogenization zone is at a temperature of 130° C.

The reaction zone is at a temperature of 180° C.

The zone for introduction of additives (filler material and stabilizing agent), when they are added, is at a temperature of 180° C.

The compression zone is at a temperature of 180° C.

The discharge zone is at a temperature of 180° C.

A second extruder used is the twin-screw co-rotary WERNER & PFLEIDERER ZSK® 58 extruder. The diameter of the screws is 58 mm and their length is 2160 mm. The rotation speed of the screws is 200 rpm (rotations per minute).

The extruder is fitted out so that it comprises successively a loading zone, a zone for melting of the material, a homogenization zone, a reaction zone, optionally a zone for introduction of additives and a compression-discharge zone preceded by a degassing zone. Each of these zones is at a very specific temperature.

The $\epsilon$-caprolactone polymer loading zone is at a temperature less than or equal to 20° C. The DHBP is introduced into this zone in the form of a mixture with an $\epsilon$-caprolactone polymer.

The zone for melting of the material is at a temperature of 120° C.

The homogenization zone is at a temperature of 120° C.

The reaction zone is at a temperature of 180° C.

The degassing zone is at a temperature of 160° C.

The compression-discharge zone is at a temperature of 120° C.

Device for Introduction of LUPERSOL® 101 DHBP in a Mixture with Carbon Dioxide

Figure 2:
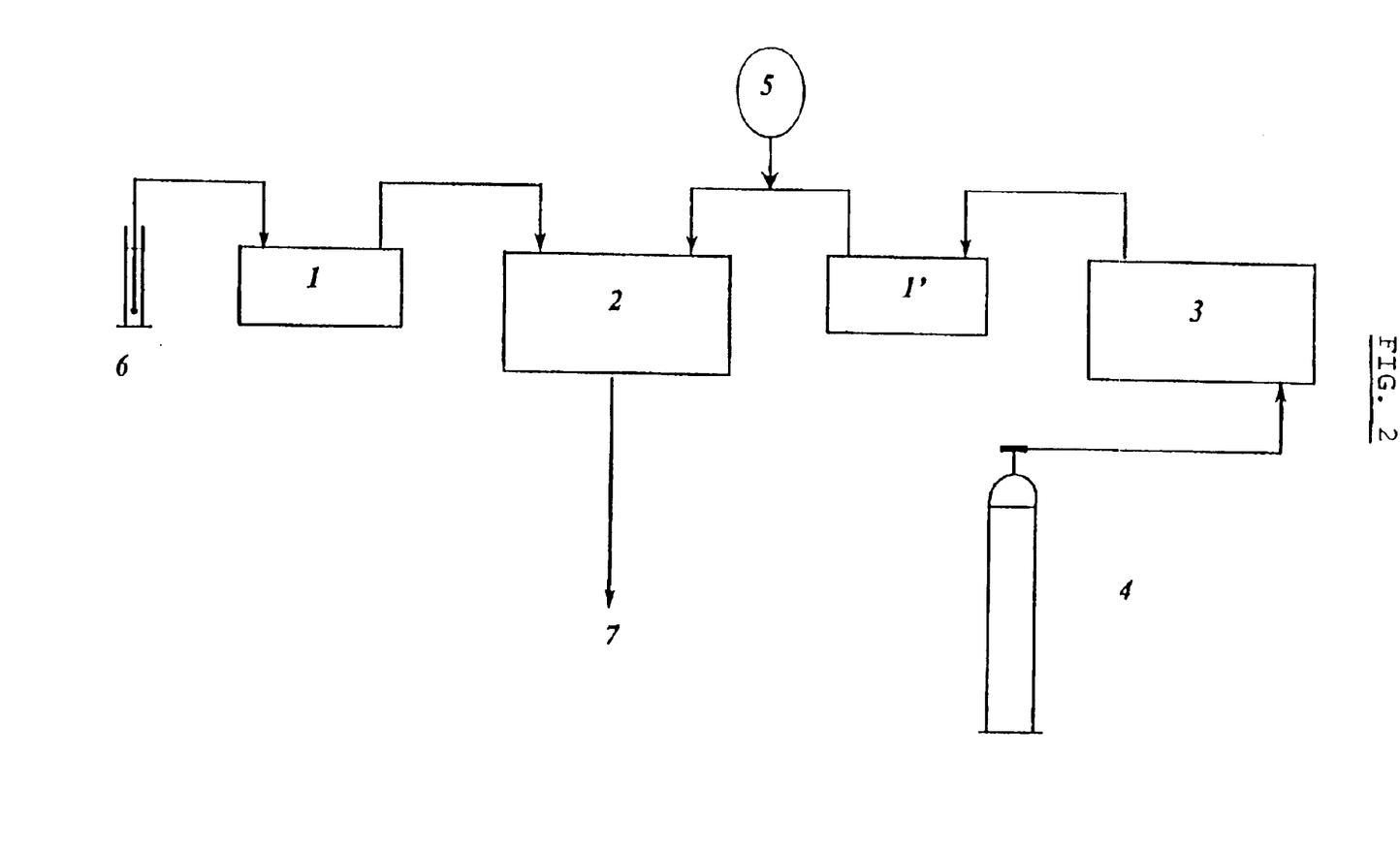
FIG. 2 depicts a device for the introduction of an organic peroxide in a mixture with carbon dioxide.

The device for introduction of organic peroxide in a mixture with carbon dioxide is illustrated schematically in FIG. 2.

The LUPERSOL® 101 DHBP contained in tank 6 is fed into mixing chamber 2 by means of pump 1. The liquid carbon dioxide contained in tank 4 is cooled to −10° C. in cryothermostat 3 prior to being fed into the mixing chamber 2 by means of a pump 1'. The mixture of DHBP and liquid carbon dioxide prepared in the mixing chamber then is discharged into injector 7 the pressure of which is read by means of a pressure sensor 5.

Liquid carbon dioxide tank 4 is a carboy under pressure with carbon dioxide.

Pumps 1 and 1' are pumps of the GILSON 305 or 306 type. The head of pump 1' provided for the carbon dioxide is equipped with a GILSON 5/10/25SG thermostat kit which makes it possible to cool the head to −10° C. The coolant liquid is isopropanol cooled in a JUBALO F30 type cryothermostat.

This same cryothermostat is used to cool the liquid carbon dioxide (cryothermostat 3).

Mixing chamber 2 is an analytical mixer equipped with a GILSON 811C type helix.

Injector 7 is an injector making it possible to work under high pressure (in excess of 74 bar).

A pressure sensor 5 of the GILSON 806 type is placed between pump 1' and mixing chamber 2 to read the pressure in the injector (between 90 and 120 bar).

The injector of the introduction device is arranged perpendicularly to the cover of the extruder and opens tangentially onto the thread of the extrusion screw. It is arranged precisely perpendicularly to the melting zone of the extruder. The carbon dioxide at the injector generally is in the supercritcal state.

Preparation of the Mixture of DHBP45-IC with CAPA® 65100 Poly-$\epsilon$-caprolactone The 2,5-dimethyl-2,5-di-t-butylperoxyhexane DHBP-45-IC was mixed with CAPA® 65100 poly-$\epsilon$-caprolactone in a mixer stirred at slow speed, in the ratio of 30 g of DHBP-45-IC per kg of CAPA® 65100 poly-$\epsilon$-caprolactone.

Characterization of the Compositions Obtained

The compositions obtained are characterized by:

MFI measurements for determination of the RMFI, measurement of the gel level, measurement of the mean molecular mass in number, measurement of their crystallization temperature, measurements of dynamic rheometry (ARES) for determination of the crystallization speed and the induction time on the one hand, and for determination of the viscoelastic properties (dynamic viscosity, tan $\delta$) according to frequency, on the other hand, measurements of elongational rheometry (RME) for determination of the elongational viscosity.

Determination of the RMFI

The RMFI is obtained by calculating the ratio between the $MFI_{8/2}$ obtained with a cylindrical die (height 8 mm +/−0.025, diameter 2.095 mm +/−0.003) and the $MFI_{0.3/1}$ obtained with a conical die such as illustrated in FIG. 1. The conical die is characterized by a cone angle of 60° +/−0.5, an external diameter of 9.48 mm, an internal diameter of 1.0+/−0.025, a total height of 2.55 mm +/−0.025 and a cylindrical section height of 0.3 mm +/−0.025. The two MFI are obtained by measuring the quantity of polymer passing through a calibrated die, the characteristics of which are set forth hereinabove, at a temperature of 100° C. under the action of a mass of 5 kg and at the same temperature. The MFI are expressed in dg/min.

Measurement of the Gel Level

The gel level is the level of polymers insoluble in chloroform extracted by means of a soxhlet after 8 hours.

Measurement of the Mean Molecular Mass in Number

The mean molecular mass in number is measured by gel permeation chromatography, using chloroform as solvent, by means of a column of the Polymer Laboratories Mix-C type and a refractometer of the Waters Differential Refractometer R401 type. The concentration of the sample is 20 mg/mL and the flow rate 1 mL/min. The standards used are polystyrene standards and the conversion factor used is 0.6.

Measurement of the Crystallization Temperature

The crystallization temperature of the compositions is measured by differential thermal analysis, in the first cooling pass, after having erased the thermal history thereof and with a scanning speed of 10 K/min.

Thus the sample, after having been maintained at −50° C. for 5 minutes, is brought to a temperature of 120° C. with a constant sweeping speed of 10° K/min. After having been maintained for 5 minutes at 120° C., the sample is subjected to a cooling with a scanning speed of 10° K/min. and it is at the time of this cooling that the crystallization temperature is measured.

Measurements of Dynamic Rheometry

The measurements of dynamic rheometry are performed by means of a rheogoniometer with imposed deformation, marketed by RHEOMETRICS under the name ADVANCED RHEOLOGICAL EXPANSION SYSTEM (ARES). The measurements are performed on the sample, placed between 2 parallel plates and subjected to a periodic deformation applied by the movement of one plate with respect to the other, with a diameter of 25 mm and a thickness of 2 mm cut into a pressed sheet.

For the determination of the crystallization speed and the induction time, the sample is subjected to a thermal treatment calculated so as to follow the evolution of the dynamic viscosity, at a specific deformation frequency, according to time, throughout the crystallization process. The thermal treatment consists in heating the sample to 150° C. with a speed of 24° C./min, maintaining it at 150° C. for 10 minutes, cooling it to 47° C. with a speed of 24° C./min and then to 45° C. with a speed of 2° C./min. The evolution of the dynamic viscosity at 45° C., according to time, at a frequency of 1 rad/s, is entered on a graph.

The slope of the curve seen when the dynamic viscosity increases at the time of crystallization is a measurement of the crystallization speed.

The induction time for the crystallization corresponds to the time during which the dynamic viscosity remains constant prior to increasing significantly at the time of nucleation in the $\epsilon$-caprolactone polymers, zero time corresponding to arrival at the temperature of 45° C.

For determination of the viscoelastic properties (dynamic viscosity, tan $\delta$) according to frequency, the sample is subjected to a deformation at a constant temperature of 80° C. The result of the measurement (ARES diagram) is expressed by the variation, at 80° C., of the dynamic viscosity expressed in Pa.s or the moduli G" (modulus of loss) and G' (modulus of elasticity), expressed in Pa, according to the frequency expressed in rad/s. Tan $\delta$ is the ratio between the moduli G" and G'.

Measurements of Elongational Rheometry

The measurements of elongational rheometry are performed by means of a rheometer marketed by RHEOMETRICS under the name RME (RHEOMETRICS ELONGATIONAL RHEOMETER FOR MELTS). The sample (52× 7×1.5 mm) is obtained by extrusion and is subjected to a procedure for release of the internal stresses prior to the measurements.

The result of the measurement (RME diagram) is expressed by the variation, at 80° C., of the elongational viscosity in the molten state (expressed in kPa.s) according to time (expressed in s) for an elongation gradient (expressed in $s^{-1}$) of 1.

Films

Films were made by blowing extrusion starting from the compositions obtained, when that was possible, by means of an extruder of the DOLCI 20 type. This single-screw extruder is used to bring the material to the molten state (75–150° C.) prior to forcing it through a ring-shaped die with a diameter of 30 mm and an air-gap of 0.75 mm (core of 28.5 mm), positioned perpendicularly to the axis of the extruder, so that the product exits vertically upward. The flow rate of the material is regulated by changing the speed of rotation of the screw. The tubular paraison then is inflated by an internal air pressure and cooled externally by a flow of air distributed uniformly around the bubble thus formed a few centimeters above the die. The air may be refrigerated, but it advantageously is at ambient temperature. The rate of inflation (defined as equal to the ratio of the perimeter of the film over the perimeter of the die) is regulated by adjusting the internal air pressure. The bubble then is flattened gradually by 2 guides, then gripped between 2 rollers, of which at least one is coated with rubber and at least one is driven. The tubular paraison therefore also is drawn in the axial direction by the two gripping rollers. The rate of drawing (defined as equal to the ratio of the speed of the film at winding over the speed of the film at the die) is adjusted by varying the speed of the gripping rollers. The final thickness of the film depends on the air-gap of the die, the rate of inflation and the rate of drawing.

Characterization of the Films Obtained

Measurements of traction, impact resistance and tear resistance were performed on the films obtained.

Measurements of Traction

The measurements of traction are effected in accordance with ISO standard 527-3 (1993) on test-pieces 50×15 $mm^2$, at 23° C. and 50% relative humidity and with a speed of 100 mm/min (INSTRON tractive machine).

The nominal stress (ratio of the tractive force over the initial section) and the elongation (ratio of the length after traction over the initial length, or 50 mm) in the direction of extrusion or in the direction perpendicular to extrusion are determined.

The nominal stress is expressed in MPa and the elongation in %.

Measurements of Impact Resistance

The impact resistance is measured according to ISO standard 7765-1 (1998) (method A). The ratio of the weight thus determined to the thickness of the sample is calculated to express the result in g/μm.

Measurement of Resistance to Tear Propagation

The resistance to tear propagation is measured according to the "Elmendorf" technique described in the ASTM-D1922 standard on test-pieces with a constant radius, at 23° C. and 50% relative humidity with a 1.6 kgf pendulum. In the case of films having a low tear resistance, several samples were superposed as the standard specifies. To prevent them from becoming fused at the time of impact, the different layers then were separated with a very thin insert, for which it was verified that it would not disrupt the measurement.

The resistance to tear propagation is determined in the direction of extrusion or in the direction perpendicular to extrusion.

The resistance to tear propagation is expressed in N.

EXAMPLE 1

The CAPA® 680 poly-$\epsilon$-caprolactone was introduced into the loading zone of the WERNER & PFLEIDERER ZSK® 40 extruder with a flow rate of 30 kg/h and was spread through the different zones of the extruder.

In the melting zone of the extruder, the LUPERSOL® 101 DHBP, in a mixture with carbon dioxide, was sprayed onto the poly-$\epsilon$-caprolactone by means of the introduction device described hereinabove. The LUPERSOL® 101 DHBP was introduced at the rate of 1 g per kg of CAPA® 680 poly-$\epsilon$-caprolactone and at the rate of 570 μl of DHBP in 5 mL of carbon dioxide per minute.

The values for RMFI, gel level, mean molecular mass in number, crystallization temperature ($T_c$) and tan δ measured on the composition obtained are set forth in Table I.

Figure 3:
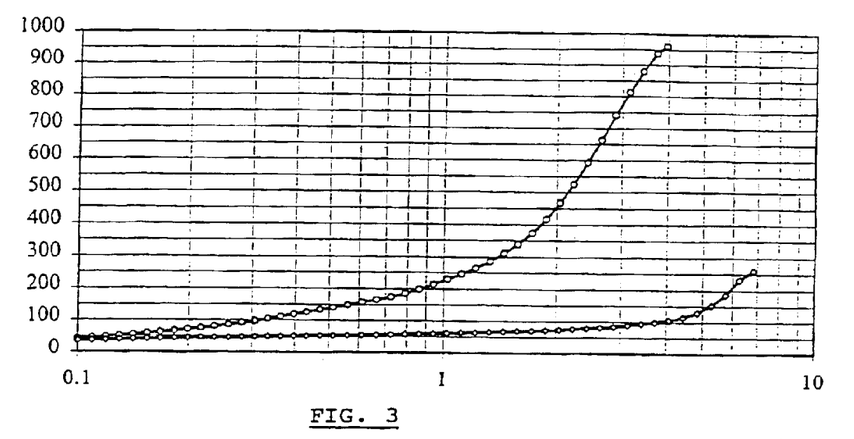
FIG. 3 shows the variation in elongational viscosity (kPa·s) of the aliphatic polyester of Examples 1 and 2 at 80° C. versus time for an elongational gradient of 1 s$^{-1}$.

The variation in elongational viscosity (expressed in kPa.s) at 80° C., according to time (expressed in s) for an elongation gradient (expressed in $s^{-1}$) of 1 is illustrated in FIG. 3 (symbol ○).

Figure 4:
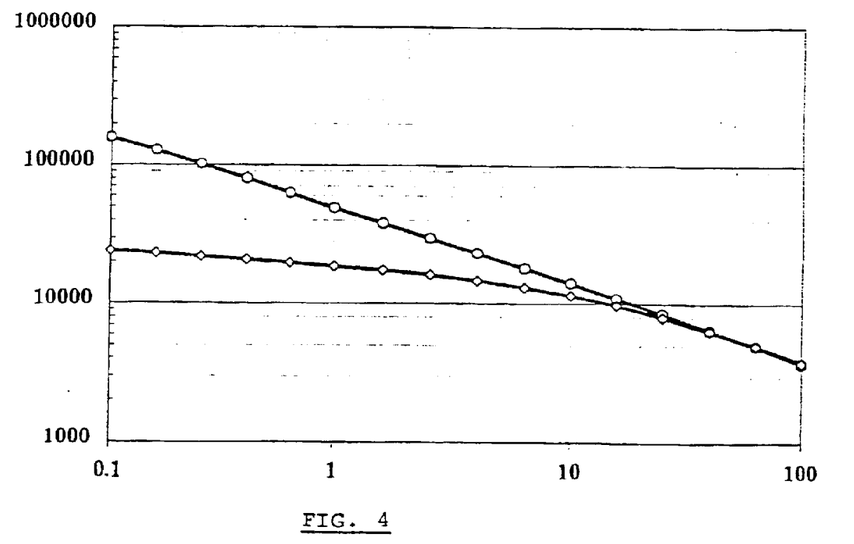
FIG. 4 shows the variation in dynamic viscosity (Pa·s) of an aliphatic polyester of Examples 1 and 2 versus a frequency (rad/s) at 80° C.

The variation in dynamic viscosity (expressed in Pa.s) according to the frequency (expressed in rad/s) at 80° C. is illustrated in FIG. 4 (symbol ○).

Two films (No. 1.1, 1.2) were prepared starting from the composition according to example 1 in the manner described hereinabove and with the conditions set forth hereinbelow.

| Film No. | Flow rate kg/h | Speed, m/minimum | Thickness | Drawing rate | Inflation rate |
|---|---|---|---|---|---|
| 1.1 | 2.3 | 1.7 | 48 | 3 | 4.4 |
| 1.2 | 2.3 | 3.5 | 19 | 6.3 | 4.4 |

The two films are characterized by an impact resistance of 1.2 and 2.3 g/μm respectively. Film No. 1.1 is characterized by a resistance to tear propagation of 0.3 N in the direction of extrusion and of 0.65 N in the direction perpendicular to extrusion.

EXAMPLE 2 (COMPARATIVE)

Example 1 was repeated in the absence of DHBP.

The values for RMFI, gel level, mean molecular mass in number, crystallization temperature ($T_c$) and tan δ measured on the composition obtained are set forth in Table I.

The variation in elongational viscosity (expressed in kPa.s) at 80° C., according to time (expressed in s) for an elongation gradient (expressed in $s^{-1}$) of 1 is illustrated in FIG. 3 (symbol □).

The variation in dynamic viscosity (expressed in Pa.s) according to frequency (expressed in rad/s) at 80° C. is illustrated in FIG. 4 (symbol ○).

It was not possible to obtain a film by blowing extrusion from the composition according to example 2.

EXAMPLE 3

Example 1 was repeated, replacing the CAPA® 680 poly-$\epsilon$-caprolactone with a mixture of 40% by weight of CAPA® 680 poly-$\epsilon$-caprolactone and 60% by weight of CAPA® 650 poly-$\epsilon$-caprolactone. The mean molecular mass in number, measured by gel permeation chromatography, is 55,000 g/mole.

The values for RMFI, gel level, mean molecular mass in number, crystallization temperature ($T_c$) and tan δ measured on the composition obtained are set forth in Table I.

Figure 5:
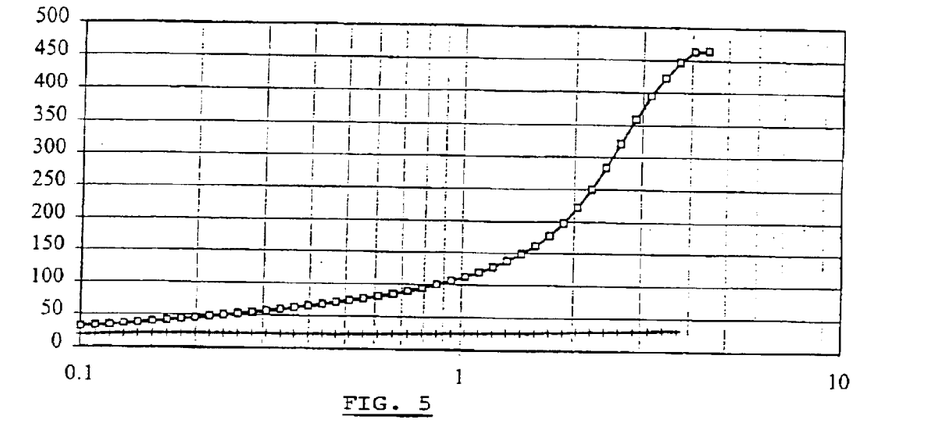
FIG. 5 shows the variation in elongational viscosity (kPa·s) of an aliphatic polyester of Examples 3 and 4 at 80° C. versus time for an elongational gradient of 1 s$^{-1}$.

The variation in elongational viscosity (expressed in kPa.s) at 80° C., according to time (expressed in s) for an elongation gradient (expressed in $s^{-1}$) of 1 is illustrated in FIG. 5 (symbol □).

Figure 6:
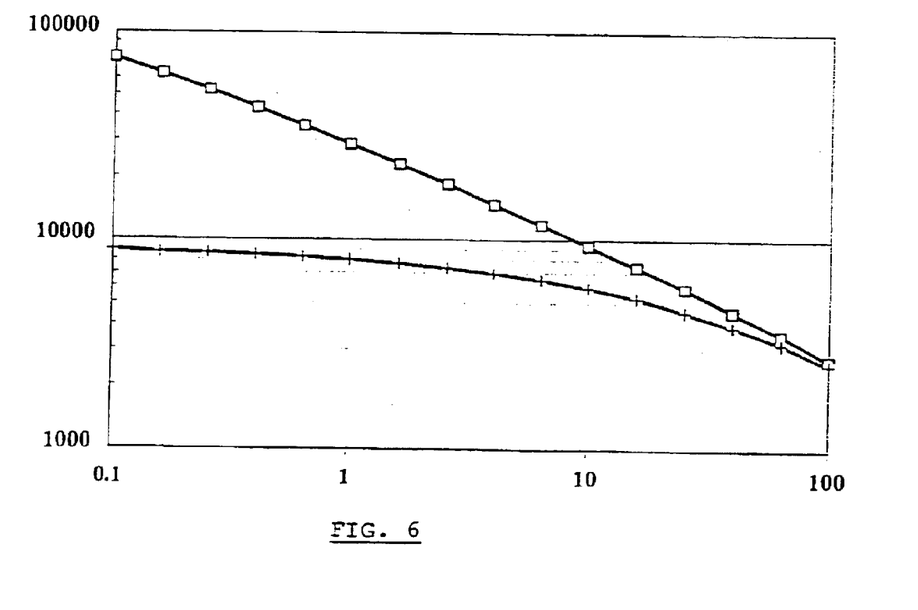
FIG. 6 shows the variation in dynamic viscosity (Pa·s) of an aliphatic polyester of Examples 3 and 4 versus a frequency (rad/s) at 80° C.

The variation in dynamic viscosity (expressed in Pa.s) according to frequency (expressed in rad/s) at 80° C. is illustrated in FIG. 6 (symbol □).

A film was prepared starting from the composition according to example 3 in the manner described hereinabove and with the conditions set forth hereinbelow.

| Film No. | Flow rate kg/h | Speed, m/minimum | Thickness | Drawing rate | Inflation rate |
|---|---|---|---|---|---|
| 3.1 | 2.1 | 1.3 | 59 | 2.5 | 4.5 |

The measurements of traction performed on this film yield the following results: the nominal stress in the direction of extrusion is 46 MPa, the elongation in the direction of extrusion is 1000%, the nominal stress in the direction perpendicular to extrusion is 48 MPa and the elongation in the direction perpendicular to extrusion is 950%.

The film is characterized by an impact resistance of 0.9 g/μm.

The film also is characterized by a resistance to tear propagation of 0.7 N in the direction of extrusion and 0.95 N in the direction perpendicular to extrusion.

EXAMPLE 4 (COMPARATIVE)

Example 3 was repeated in the absence of DHBP.

The values for RMFI, gel level, mean molecular mass in number, crystallization temperature ($T_c$) and tan δ measured on the composition obtained are set forth in Table I.

The variation in elongational viscosity (expressed in kPa.s) at 80° C., according to time (expressed in s) for an elongation gradient (expressed in $s^{-1}$) of 1 is illustrated in FIG. 5 (symbol +).

The variation in dynamic viscosity (expressed in Pa.s) according to frequency (expressed in rad/s) at 80° C. is illustrated in FIG. 6 (symbol +).

It was not possible to obtain a film by blowing extrusion from the composition according to example 4.

The ratio between the speed of crystallization of the composition according to the invention (example 3) and the speed of crystallization of the corresponding composition (comparative example 4) is equal to 3.45.

The ratio between the induction time of the composition according to the invention (example 3) and the induction time of the corresponding composition (comparison example 4) is equal to 0.65.

EXAMPLE 5

Example 3 was repeated, adding 30% by weight, in relation to the final composition, of OMYA BLH™ calcium carbonate and 3.5 g of the stabilizing agent IRGANOX® 1330 per kg of poly-$\epsilon$-caprolactone.

The values for RMFI, gel level, mean molecular mass in number, crystallization temperature ($T_c$) and tan δ measured on the composition obtained are set forth in Table I.

Figure 7:
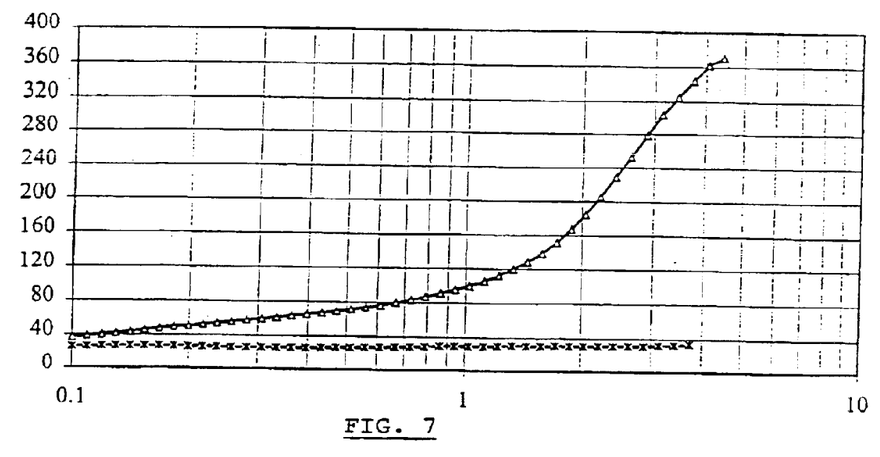
FIG. 7 shows the variation in elongational viscosity (kPa·s) of an aliphatic polyester of Examples 5 and 6 at 80° C. versus time for an elongational gradient of 1 s$^{-1}$.

The variation in elongational viscosity (expressed in kPa.s) at 80° C., according to time (expressed in s) for an elongation gradient (expressed in $s^{-1}$) of 1 is illustrated in FIG. 7 (symbol ▲).

Figure 8:
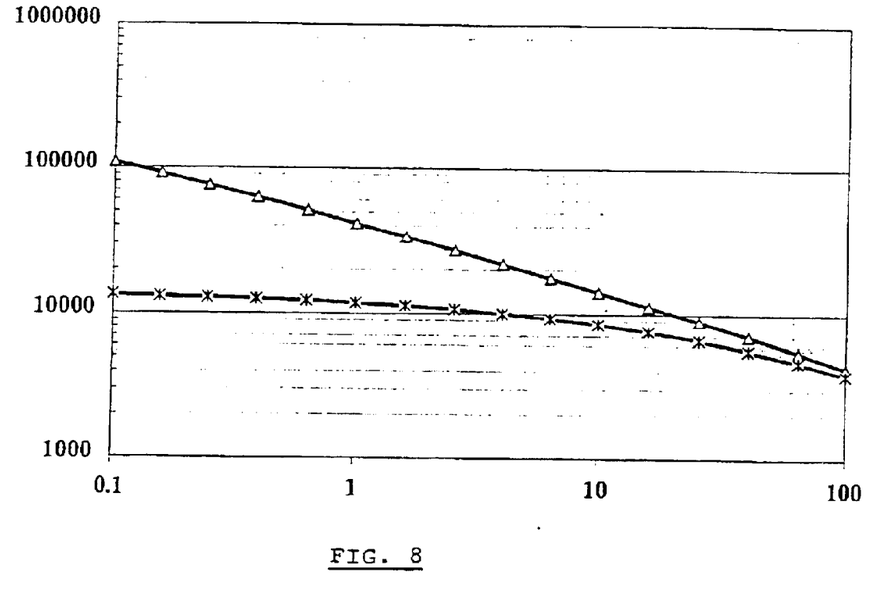
FIG. 8 shows the variation in dynamic viscosity (Pa·s) of an aliphatic polyester of Examples 5 and 6 versus a frequency (rad/s) at 80° C.

The variation in dynamic viscosity (expressed in Pa.s) according to frequency (expressed in rad/s) at 80° C. is illustrated in FIG. 8 (symbol ▲).

A film (No. 5.1) was prepared starting from the composition according to example 5 in the manner described hereinabove and with the conditions set forth hereinbelow.

| Film No. | Flow rate kg/h | Speed, m/minimum | Thickness | Drawing rate | Inflation rate |
|---|---|---|---|---|---|
| 5.1 | 3 | 1.4 | 50 | 2.4 | 4.6 |

Film No. 5.1 is characterized by an impact resistance lower than 0.8 g/μm.

EXAMPLE 6 (COMPARATIVE)

Example 5 was repeated in the absence of DHBP.

The values for RMFI, gel level, mean molecular mass in number, crystallization temperature ($T_c$) and tan δ measured on the composition obtained are set forth in Table I.

The variation in elongational viscosity (expressed in kPa.s) at 80° C., according to time (expressed in s) for an elongation gradient (expressed in $s^{-1}$) of 1 is illustrated in FIG. 7 (symbol ●).

The variation in dynamic viscosity (expressed in Pa.s) according to frequency (expressed in rad/s) at 80° C. is illustrated in FIG. 8 (symbol ●).

It was not possible to obtain a film by blowing extrusion from the composition according to example 6.

EXAMPLE 7

A mixture of 40% by weight of CAPA® 680 poly-$\epsilon$-caprolactone and 60% by weight of CAPA® 650 poly-$\epsilon$-caprolactone was introduced into the loading zone of the WERNER & PFLEIDERER ZSK® 58 extruder and was spread through the different zones of the extruder.

In the loading zone of the extruder there also was introduced DHBP in the form of a mixture of DHBP-45-IC with CAPA® 65100 poly-$\epsilon$-caprolactone as described hereinbefore. The total flow rate of the poly-$\epsilon$-caprolactones is 150 kg/h and the quantity of DHBP is 1 g/kg of the mixture of poly-$\epsilon$-caprolactones.

The values for RMFI, gel level, mean molecular mass in number, crystallization temperature ($T_c$) and tan δ on the composition obtained are set forth in Table I.

Figure 9:
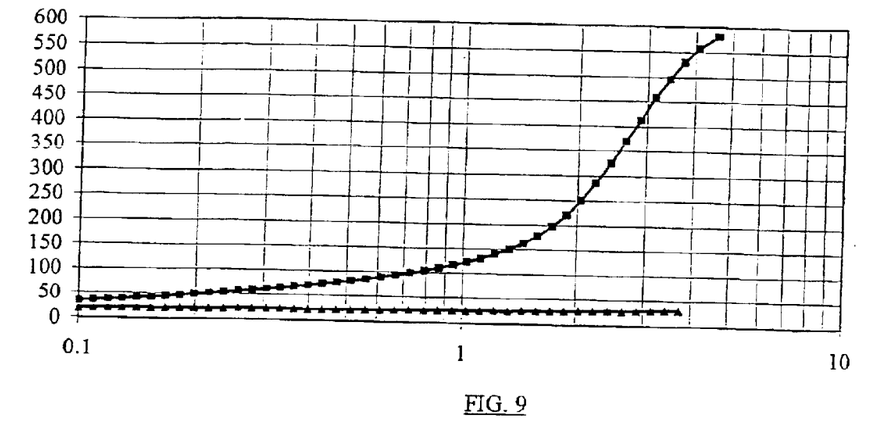
FIG. 9 shows the variation in elongational viscosity (kPa·s) of an aliphatic polyester of Examples 7 and 8 at 80° C. versus time for an elongational gradient of 1 s$^{-1}$.

The variation in elongational viscosity (expressed in kPa.s) at 80° C., according to time (expressed in s) for an elongation gradient (expressed in s$^{-1}$) of 1 is illustrated in FIG. 9 (symbol ■).

Figure 10:
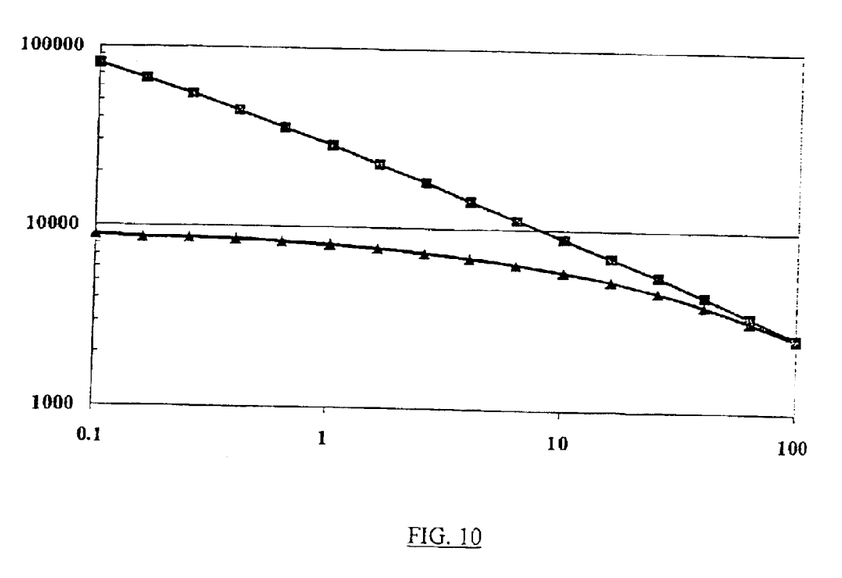
FIG. 10 shows the variation in dynamic viscosity (Pa·s) of an aliphatic polyester of Examples 7 and 8 versus a frequency (rad/s) at 80° C.

The variation in the dynamic viscosity (expressed in Pa.s) according to frequency (expressed in rad/s) at 80° C. is illustrated in FIG. 10 (symbol ■).

A film was prepared starting from the composition according to example 7 in the manner described hereinabove and with conditions similar to those used for the film prepared starting from the composition according to example 3.

The film obtained is characterized by a homogeneous thickness and by characteristics similar to the one obtained starting from the composition according to example 3.

EXAMPLE 8 (COMPARATIVE)

Example 7 was repeated in the absence of DHBP.

The values for RMFI, gel level, mean molecular mass in number, crystallization temperature ($T_c$) and tan δ measured on the composition obtained are set forth in Table I.

The variation in elongational viscosity (expressed in kPa.s) at 80° C., according to time (expressed in s) for an elongation gradient (expressed in s$^{-1}$) of 1 is illustrated in FIG. 9 (symbol ▼).

The variation is dynamic viscosity (expressed in Pa.s) according to frequency (expressed in rad/s) at 80° C. is illustrated in FIG. 10 (symbol ▼).

It was not possible to obtain a film by blowing extrusion from the composition according to example 8.

TABLE I

| Example | RMFI | Gel level (%) | Mean molecular mass in number | $T_c$ (° C.) | Tan δ |
|---|---|---|---|---|---|
| 1 | 1.31 | 0 | 80,000 | 35 | 1.15 |
| 2 comparative | 0.96 | 0 | 70,000 | 32 | 8.18 |
| 3 | 1.61 | 0 | 64,000 | 36 | 1.64 |
| 4 comparative | 0.90 | 0 | 55,000 | 32 | 27.2 |
| 5 | 1.31 | 0 | 64,000 | 36 | 1.62 |
| 6 comparative | 0.98 | 0 | 55,000 | 35 | 37.9 |
| 7 | 1.7 | 0 | 59,000 | 34 | 1.47 |
| 8 comparative | 0.90 | 0 | 55,000 | 32 | 27.2 |

From the analysis of the results of Table I, it appears that the compositions according to the invention are characterized by a crystallization temperature ($T_c$) which is at least 1° C. higher than those observed for the corresponding compositions. In addition, it is noted that the crystallization speed of the compositions according to the invention is much greater than that of the corresponding compositions.

The compositions according to the invention furthermore are characterized by a tan δ value clearly lower than those measured for the corresponding compositions.

From the study of FIGS. 3, 5, 7 and 9, it appears that the compositions according to the invention furthermore are characterized by an exponential increase in elongational viscosity according to time, characteristic of a structural hardening under stress, unlike the corresponding compositions.

In addition, the point of inflection corresponding to the exponential increase in elongational viscosity according to time is less than 3 seconds, unlike the corresponding compositions.

From the study of FIGS. 4, 6, 8 and 10 (logarithmic graphs) it appears that the compositions according to the invention furthermore are characterized by a nearly linear relationship between dynamic viscosity and frequency. As for the corresponding compositions, they are characterized by an evolution of dynamic viscosity toward the descending frequencies in the form of a Newtonian plateau.

From the study of the results relating to the films obtained, it appears that the compositions according to the invention make it possible to obtain films. These films are resistant to traction, impact and tearing. On the other hand, the corresponding compositions do not make it possible to obtain films by blowing extrusion.

What is claimed is:

1. A process for preparation of a thermoplastic polyester composition, comprising:

passing a thermoplastic aliphatic polyester into an extruder successively comprising a polymer loading zone, a melting zone, a homogenization zone, a reaction zone in which molten thermoplastic aliphatic polyester reacts with a radical generator employed in a quantity ranging from 0.01 to 0.2% by wt based on the thermoplastic aliphatic polyester, and a discharge zone, wherein the temperature of the loading zone is ≦20° C., the temperature in the melting zone and in the homogenization zone is ≧ the melting temperature of the polymer and ≦ the temperature at which the half-life period of the radical generator is ten times greater than the dwell time of the material in each of said zones and the temperature of the reaction zone is ≧ the temperature at which the half-life period of the radical generator is ≦the dwell time of the material in this zone, thereby producing an extrudate having an RMFI value ranging from 1.1 to 2.5; and obtaining the extruded polyester.

2. The process according to claim 1, wherein the aliphatic polyester entering the extruder is such that the ester functions thereof are separated by a chain of at least 2 carbon atoms.

3. The process according to claim 1, wherein the extruder device further successively comprises an additive introduction zone and a degassing zone after the reaction zone.

4. The process according to claim 1, wherein the radical generator is introduced into the extruder in a mixture with carbon dioxide.

5. The process according to claim 1, wherein the radical generator is introduced into the extruder by means of a thermoplastic aliphatic polyester that contains a radical generator.

6. The process according to claim 1, wherein the radical generator is introduced into the extruder by means of a filler material containing the radical generator.

7. The process according to claim 6, wherein at least one filler material is incorporated into the thermoplastic aliphatic polyester by introduction into the extruder.

8. The process according to claim 1, wherein the aliphatic polyester that is produced has a dynamic viscosity, as measured at a temperature 20 to 40° C. higher than the melting temperature of the thermoplastic aliphatic polyester, ranges from 0.1 to 100 rad/s.

9. The process according to claim 1, wherein the aliphatic polyester is a hydroxyalcanoate, polybutylene succinate or a ε-caprolactone polymer.

10. The process according to claim 9, wherein the ε-caprolactone polymer is a copolymer having a ε-caprolactone content of at least 50% by weight with a comonomer selected from the group consisting of β-propiolactone, γ-butyrolactone, δ-valerolactone, 1,4-dioxane-2-one, 1,4-dioxepane-2-one, 1,5-dioxepane-2-one and a glycolide.

11. The process according to claim 1, wherein the thermoplastic aliphatic polyester is comprised of a mixture of 0.1 to 80% by wt of a low molecular weight polyester component and 99.9 to 20% by weight of a high molecular weight polyester component.

12. The process according to claim 11, wherein the low molecular weight aliphatic polyester has a number average molecular weight ranging from $\geq 10,000$ g/mole to $\leq 60,000$ g/mole and the high molecular weight aliphatic polyester has a number average molecular weight ranging from $\geq 60,000$ g/mole to $\leq 200,000$ g/mole.

13. The process according to claim 1, wherein the aliphatic polyester has an RMFI value ranging from 1.2 to 2.

* * * * *